Oct. 20, 1925.
J. ZUBATY
1,557,956
PENDULUM TORQUEMETER
Filed Dec. 12, 1924
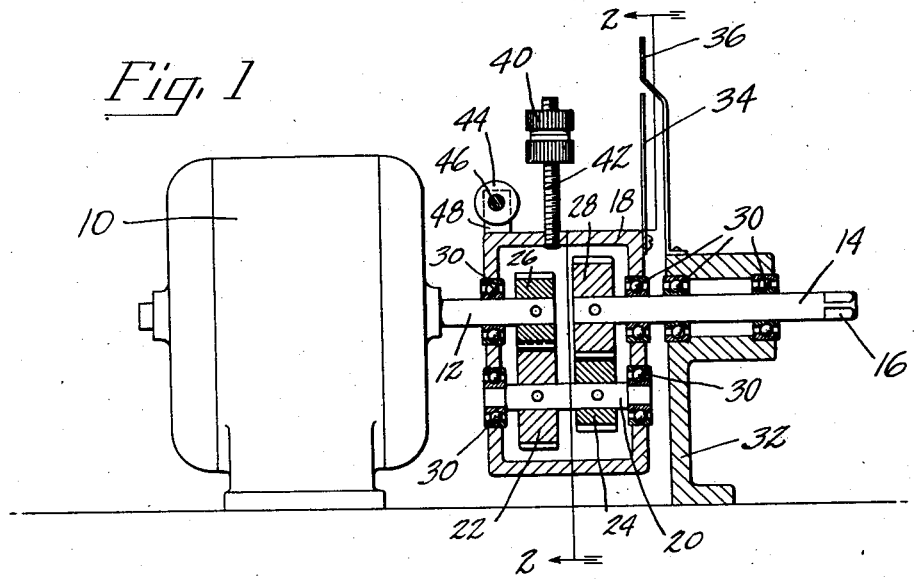
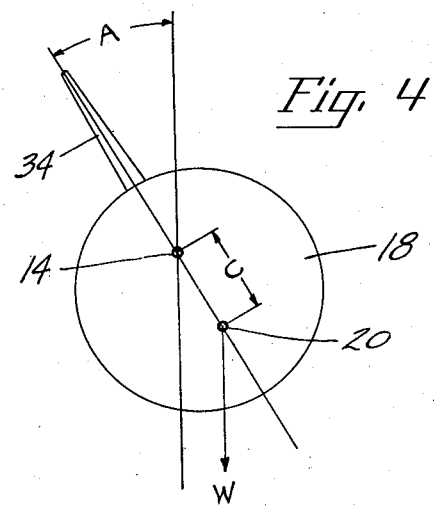
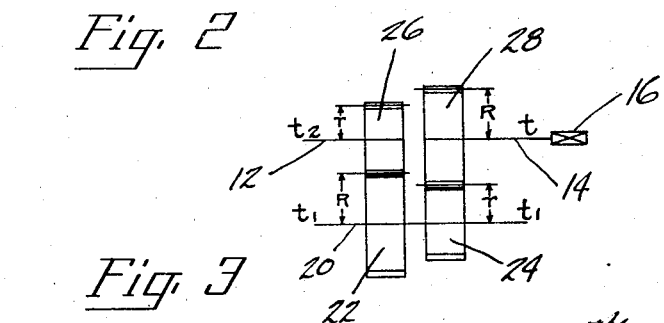
INVENTOR
Joseph Zubaty
BY
Blackmore, Spencer & Flint
ATTORNEYS Patented Oct. 20, 1925.

1,557,956

UNITED STATES PATENT OFFICE.

JOSEPH ZUBATY, OF FLINT, MICHIGAN, ASSIGNOR TO A. C. SPARK PLUG COMPANY, OF FLINT, MICHIGAN, A CORPORATION OF MICHIGAN.

PENDULUM TORQUEMETER.

Application filed December 12, 1924. Serial No. 755,477.

*To all whom it may concern:*

Be it known that I, JOSEPH ZUBATY, a citizen of Czechoslovakia, and a resident of Flint, county of Genesee, and State of Michigan, have invented certain new and useful Improvements in Pendulum Torquemeters, of which the following is a full, clear, concise, and exact description, such as will enable others skilled in the art to which the invention relates to make and use the same, reference being made therein to the accompanying drawings, which form a part of this specification.

This invention relates to torquemeters, and is illustrated as embodied in a torquemeter of the pendulum type. An object of the invention is to provide a very sensitive torquemeter, preferably adjustable, for measuring the torque caused by friction, etc., in small instruments such as speedometers.

In one desirable arrangement, motor-driven planetary gearing is connected to drive the speedometer, or other mechanism whose resistance torque is being measured, the gearing being so arranged in an eccentrically-pivoted drum that the drum constitutes a pendulum whose angular movement is a function of the resistance torque being measured.

It is preferable, in the described arrangement, to provide means for varying the position of the center of gravity of the parts making up the pendulum, to correct the zero position of the indicating means, or to vary the sensitiveness or both. In the instrument shown in the drawings, there is one weight which is tangentially-adjustable to correct the zero position, and another which is radially-adjustable to vary the sensitiveness.

The above, and other objects and features of the invention, will be apparent from the following description of one illustrative embodiment shown in the accompanying drawings, in which:

Figure 1 is a view of the instrument with the drum and associated parts in longitudinal vertical section and with the motor in side elevation;

Figure 2 is a transverse vertical section on the line 2—2 of Figure 1, with the indicating means and the adjustable weights appearing in front elevation;

Figure 3 is a diagram corresponding to Figure 1, but showing certain quantitative relationships of the parts; and Figure 4 is a diagram corresponding to Figure 2, showing the angular displacement of the drum by the resistance torque being measured.

The illustrated arrangement includes a motor 10 having a driving shaft 12, and a shaft 14 which is axially alined with shaft 12, and which is squared at its end 16 to be connected to a speedometer or other mechanism. A drum or casing 18 is freely and eccentrically journalled on alined shafts 12 and 14. A counter-shaft 20 is journaled in the drum below, and parallel to the axis of, alined shafts 12 and 14, two gears 22 and 24 pinned to the counter-shaft to rotate together being arranged to mesh respectively with gears 26 and 28 on the adjacent ends of shafts 12 and 14. In the particular arrangement illustrated, gears 26 and 24 are of the same size, with a radius "$r$" (Figure 3), while gears 28 and 22 are also of the same size, but larger than gears 26 and 24, and with a longer radius "$R$." Thus the whole makes up a set of planetary reduction gears coupling shafts 12 and 14. Shafts 12, 14, and 20 are preferably provided with anti-friction bearings 30 in the drum 18 and in a stationary standard 32.

Angular movement of the drum is indicated by suitable means, such as a pointer 34 on the drum, which traverses a scale 36 fixed on standard 32. The center of gravity of the drum and its associated parts can be raised and lowered, with respect to the axis of shafts 12 and 14, by turning a weight 40 threaded on a radial arm 42 in a plane passing substantially through said axis and the center of gravity. The center of gravity can be varied laterally, to bring pointer 34 to zero on scale 36, by adjusting a weight 44 threaded on a tangentially-extending rod 46 carried by brackets 48 on the drum 18.

In the operation of the described device, weight 44 is adjusted to bring pointer 34 to zero when motor 10 is running at a constant speed, thus compensating for internal friction and for various inaccuracies. A speedometer or other mechanism is then connected at 16. Now, if this mechanism offered no resistance, i. e., if it had no resistance torque due to friction, etc., shaft 14 could still turn freely, and pointer 34 would remain at zero. If the resistance torque, on the other hand, were sufficient to hold shaft 14 stationary, obviously drum 18 would be rotated by the motor through the planetary gearing. Gear 28 being then stationary, gear 24 would be rolled around it by the action of gear 26 in forcing gear 22 to turn.

Where the resistance, however, is within the range which the instrument is designed to measure, it tends to force the casing to turn in the same manner, but in a less degree, and is soon balanced by the weight of the drum and its associated parts, which constitute in effect a pendulum which is raised by the turning of the drum. When the torque being measured is balanced by the opposite torque of this raised pendulum, tending to return the drum to its initial position, the speedometer or the like will be driven steadily by the motor, and the torque will be a function of the angular displacement of drum indicated by pointer 34 on scale 36.

As noted above, "r" may indicate the radius of gears 26 and 24, and "R" the radius of gears 22 and 28. Let "t" indicate the torque of the instrument being tested, "t¹" the torque on countershaft 20, and "t²" the torque on shaft 12. Then let "T" be the resulting torque on drum 18, "M" the moment of the instrument due to its weight, "W" the weight of the oscillating parts, and "C" the distance of the center of gravity from the axis of shafts 12 and 14 about which the drum turns. "A" is the angle the drum is turned.

I claim:

1. A pendulum type torquemeter comprising, in combination, a motor having a driving shaft, a shaft axially alined with the driving shaft and constructed and arranged to be connected to mechanism whose torque is to be measured, a drum freely and eccentrically journaled on the two alined shafts to constitute a pendulum whose angular movement is a function of the torque to be measured, planetary gearing in the drum connecting the shafts and part of which is carried by the drum in a manner to react on the drum, and means to indicate the angular movement of the drum caused by the torque being measured.

2. A pendulum type torquemeter comprising, in combination, a motor having a driving shaft, a shaft axially alined with the driving shaft and constructed and arranged to be connected to mechanism whose torque is to be measured, a drum freely and eccentrically journaled on the two alined shafts to constitute a pendulum whose angular movement is a function of the torque to be measured, planetary gearing in the drum connecting the shafts and part of which is carried by the drum in a manner to react on the drum, and a tangentially-adjustable weight for determining the zero position of the indicating means.

3. A pendulum type torquemeter comprising, in combination, a motor having a driving shaft, a shaft axially alined with the driving shaft and constructed and arranged to be connected to mechanism whose torque is to be measured, a drum freely and eccentrically journaled on the two alined shafts to constitute a pendulum whose angular movement is a function of the torque to be measured, planetary gearing in the drum connecting the shafts and part of which is carried by the drum in a manner to react on the drum, and a radially adjustable weight substantially in the plane passing through the axis of the alined shafts and the center of gravity of the drum, to vary the angle of movement of the drum caused by a given torque.

4. A pendulum type torquemeter comprising, in combination, a motor having a driving shaft, a shaft axially alined with the driving shaft and constructed and arranged to be connected to mechanism whose torque is to be measured, a drum freely journaled on said shafts, a counter-shaft journaled in the drum parallel to the alined shafts, a pair of gears on the counter-shaft which are constrained to turn together, gears on the ends of the axially-alined shafts meshing respectively with the gears on the counter-shaft, the center of gravity of the drum and the parts carried thereby being below the axis of the alined shafts to constitute a pendulum, and means for indicating angular movement of the drum.

5. A pendulum type torquemeter comprising, in combination, a motor having a driving shaft, a shaft axially alined with the driving shaft and constructed and arranged to be connected to mechanism whose torque is to be measured, a drum freely journaled on said shafts, a counter-shaft journaled in the drum parallel to the alined shafts, a pair of gears on the counter-shaft which are constrained to turn together, gears on the ends of the axially-alined shafts meshing respectively with the gears on the counter-shaft, the center of gravity of the drum and the parts carried thereby being below the axis of the alined shafts to constitute a pendulum, means to vary the position of the center of gravity with respect to said axis, and means for indicating angular movement of the drum.

6. A pendulum type torquemeter comprising, in combination, a motor having a driving shaft, a shaft axially alined with the driving shaft and constructed and arranged to be connected to mechanism whose torque is to be measured, a drum freely journaled on said shafts, a counter-shaft journaled in the drum parallel to the alined shafts, a pair of gears on the counter-shaft which are constrained to turn together, gears on the ends of the axially-alined shafts meshing respectively with the gears on the counter-shaft, the center of gravity of the drum and the parts carried thereby being below the axis of the alined shafts to constitute a pendulum, a pointer fixed on the drum, and a fixed scale traversed by the pointer.

In testimony whereof I affix my signature.

JOSEPH ZUBATY.